(12) United States Patent
Burd et al.

(10) Patent No.: US 11,027,846 B2
(45) Date of Patent: Jun. 8, 2021

(54) STOWABLE DOOR FOLDING TABLE

(71) Applicant: B/E Aerospace, Inc., Winston-Salem, NC (US)

(72) Inventors: Peter J. L. Burd, Burry Port (GB); Richard H. Jolley, Addington (GB)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 16/552,403

(22) Filed: Aug. 27, 2019

(65) Prior Publication Data

US 2021/0061470 A1    Mar. 4, 2021

(51) Int. Cl.
*B64D 11/00* (2006.01)
*A47B 5/04* (2006.01)
*B64D 11/04* (2006.01)
*A47B 31/06* (2006.01)

(52) U.S. Cl.
CPC ............ *B64D 11/0007* (2013.01); *A47B 5/04* (2013.01); *A47B 31/06* (2013.01); *B64D 11/04* (2013.01)

(58) Field of Classification Search
CPC ......... A47B 5/04; A47B 31/06; B64D 11/007; B64D 11/04
See application file for complete search history.

(56) References Cited

U.S. PATENT DOCUMENTS

| | | | |
|---|---|---|---|
| 2,616,774 A * | 11/1952 | Prince | A47B 5/06 108/38 |
| 2,763,900 A | 9/1956 | Mcafee et al. | |
| 2,854,307 A | 9/1958 | Londeree et al. | |
| 3,472,219 A | 10/1969 | Roy et al. | |
| 4,022,404 A | 5/1977 | Greiss | |
| 4,055,317 A | 10/1977 | Greiss | |
| 4,361,014 A | 11/1982 | Blain | |
| 4,375,876 A | 3/1983 | Stewart | |
| RE32,176 E | 6/1986 | Vernon | |
| 4,776,903 A | 10/1988 | Nordskog | |
| 4,836,114 A * | 6/1989 | Cohen | A47B 13/023 108/60 |

(Continued)

FOREIGN PATENT DOCUMENTS

CN       103622319 B      5/2016
DE     202015106958 U1    1/2016

(Continued)

OTHER PUBLICATIONS

Extended European Search Report dated Aug. 26, 2019 for European Appln. No. 19167878.8.

(Continued)

*Primary Examiner* — Daniel J Rohrhoff
(74) *Attorney, Agent, or Firm* — Suiter Swantz pc llo

(57) ABSTRACT

A stowable folding table is disclosed. In embodiments, the folding table has a stowed (e.g., folded) state and a deployed state between two adjacent aircraft galley structures. The folding table includes two table segments coupled by a hinge; the two segments may be folded parallel to each other and stowed (e.g., in a galley cart bay or elsewhere in or on the adjacent galley structures). The stowed table is unfolded and deployed by attaching the first and second ends respectively to a galley structure (e.g., on either side of an exit door), such that one table segment extends at an angle to the other when deployed.

14 Claims, 9 Drawing Sheets

(56) References Cited

U.S. PATENT DOCUMENTS

| | | |
|---|---|---|
| 5,090,639 A | 2/1992 | Miller et al. |
| 5,224,297 A | 7/1993 | Watkins |
| 5,322,244 A | 6/1994 | Dallmann et al. |
| 5,907,127 A | 5/1999 | Daoud |
| 6,007,025 A | 12/1999 | Coughren et al. |
| 6,257,523 B1 | 7/2001 | Olliges |
| D455,391 S | 4/2002 | Granzeier et al. |
| 6,470,512 B1 | 10/2002 | Lau et al. |
| 6,691,952 B2 | 2/2004 | Keogh |
| 6,761,332 B1 | 7/2004 | Bengtsson |
| 6,928,236 B2 | 8/2005 | Suzuki et al. |
| 7,584,926 B2 | 9/2009 | Harrington et al. |
| D604,254 S | 11/2009 | Lanfear et al. |
| D610,554 S | 2/2010 | Lanfear et al. |
| D611,005 S | 3/2010 | Lanfear et al. |
| D611,006 S | 3/2010 | Lanfear et al. |
| D615,045 S | 5/2010 | Lanfear et al. |
| D631,446 S | 1/2011 | Lanfear et al. |
| 7,954,761 B2 | 6/2011 | Johnson et al. |
| 8,322,654 B2 | 12/2012 | Gomes et al. |
| 8,387,916 B2 * | 3/2013 | Baatz ................ B64D 11/0007 244/118.1 |
| 8,519,824 B1 | 8/2013 | Rankin et al. |
| 8,820,862 B1 | 9/2014 | Erickson et al. |
| D730,804 S | 6/2015 | Cuddy et al. |
| 9,211,952 B2 * | 12/2015 | Rumeau .................... A47B 5/04 |
| 9,321,533 B2 * | 4/2016 | Cuddy .................... B64D 47/02 |
| 9,776,723 B2 * | 10/2017 | Gow .................... B64D 11/0638 |
| 10,343,574 B2 * | 7/2019 | Faruque .................... F16C 35/02 |
| 2001/0050519 A1 | 12/2001 | Kasuya |
| 2005/0070152 A1 | 3/2005 | Suzuki et al. |
| 2005/0087650 A1 * | 4/2005 | Quan ................ B64D 11/0601 244/118.6 |
| 2005/0116098 A1 | 6/2005 | Martens et al. |
| 2005/0121978 A1 | 6/2005 | McAvoy |
| 2005/0133308 A1 | 6/2005 | Reysa et al. |
| 2005/0156560 A1 | 7/2005 | Shimaoka et al. |
| 2005/0224646 A1 | 10/2005 | Mills |
| 2005/0230540 A1 | 10/2005 | Harrington et al. |
| 2006/0060181 A1 | 3/2006 | Sasaki et al. |
| 2006/0145002 A1 | 7/2006 | Loon |
| 2006/0237182 A1 | 10/2006 | Godecker et al. |
| 2007/0102579 A1 | 5/2007 | Krieglsteiner et al. |
| 2007/0228216 A1 | 10/2007 | Wenstrom |
| 2008/0001031 A1 | 1/2008 | Doebertin et al. |
| 2008/0150406 A1 | 6/2008 | Arnold et al. |
| 2009/0112377 A1 | 4/2009 | Schalla et al. |
| 2009/0206200 A1 | 8/2009 | Bolder et al. |
| 2009/0278429 A1 | 11/2009 | Erickson et al. |
| 2009/0314889 A1 | 12/2009 | Baatz et al. |
| 2009/0321574 A1 | 12/2009 | Erickson et al. |
| 2010/0001126 A1 | 1/2010 | Supan et al. |
| 2010/0050665 A1 | 3/2010 | Oswald et al. |
| 2010/0071384 A1 | 3/2010 | Lu et al. |
| 2010/0116933 A1 | 5/2010 | Erickson et al. |
| 2010/0140398 A1 | 6/2010 | Cunningham et al. |
| 2010/0155391 A1 | 6/2010 | Koschberg et al. |
| 2010/0219292 A1 | 9/2010 | Saint-Jalmes et al. |
| 2010/0243800 A1 | 9/2010 | Koschberg et al. |
| 2011/0090064 A1 | 4/2011 | Dahms et al. |
| 2011/0101160 A1 | 5/2011 | Gomes et al. |
| 2011/0148664 A1 | 6/2011 | Shiomori et al. |
| 2011/0210203 A1 | 9/2011 | Chua et al. |
| 2011/0210204 A1 | 9/2011 | Collins et al. |
| 2011/0215199 A1 | 9/2011 | Lee |
| 2011/0238742 A1 | 9/2011 | Birkmann et al. |
| 2011/0309746 A1 | 12/2011 | Eckel et al. |
| 2012/0047911 A1 | 3/2012 | Bhaysar et al. |
| 2012/0160111 A1 | 6/2012 | Hozumi et al. |
| 2012/0167807 A1 * | 7/2012 | Legeay .................... B60N 3/002 108/41 |
| 2012/0217343 A1 | 8/2012 | Koschberg et al. |
| 2012/0248245 A1 | 10/2012 | Schliwa |
| 2012/0261509 A1 | 10/2012 | Grant et al. |
| 2012/0273614 A1 | 11/2012 | Ehlers et al. |
| 2013/0098276 A1 * | 4/2013 | Trinko .................... A47C 17/46 108/33 |
| 2013/0187000 A1 | 7/2013 | Godecker et al. |
| 2013/0206904 A1 | 8/2013 | Gee et al. |
| 2013/0206906 A1 | 8/2013 | Burrows et al. |
| 2013/0247590 A1 | 9/2013 | Lu et al. |
| 2013/0248649 A1 | 9/2013 | Burd |
| 2013/0248652 A1 | 9/2013 | Godecker et al. |
| 2013/0257067 A1 | 10/2013 | Burd |
| 2013/0259562 A1 | 10/2013 | Burd |
| 2013/0270983 A1 | 10/2013 | Godecker et al. |
| 2014/0048650 A1 | 2/2014 | Schliwa et al. |
| 2014/0054416 A1 | 2/2014 | Lee |
| 2014/0209741 A1 | 7/2014 | Boenning et al. |
| 2014/0238064 A1 | 8/2014 | Hawkins et al. |
| 2014/0263835 A1 | 9/2014 | Godecker et al. |
| 2014/0291446 A1 | 10/2014 | Reams et al. |
| 2014/0319275 A1 | 10/2014 | Najd et al. |
| 2014/0339363 A1 | 11/2014 | Moje et al. |
| 2014/0352929 A1 | 12/2014 | Wu et al. |
| 2014/0353425 A1 * | 12/2014 | Boren, Jr. .............. B64D 11/04 244/118.5 |
| 2014/0355282 A1 | 12/2014 | Cuddy et al. |
| 2014/0359934 A1 | 12/2014 | Schliwa et al. |
| 2014/0367516 A1 | 12/2014 | Lange et al. |
| 2014/0367517 A1 | 12/2014 | Eckel et al. |
| 2015/0028670 A1 | 1/2015 | Boodaghians et al. |
| 2015/0061327 A1 * | 3/2015 | Millan ............... B64D 11/0638 297/163 |
| 2015/0284090 A1 * | 10/2015 | Stephens ............ B64D 11/0638 297/163 |
| 2016/0167784 A1 | 6/2016 | Schliwa et al. |
| 2017/0101187 A1 | 4/2017 | Noske et al. |
| 2017/0179756 A1 | 6/2017 | Augustat et al. |
| 2017/0309136 A1 | 10/2017 | Schoner |
| 2019/0308728 A1 * | 10/2019 | McKee ................ B64D 11/003 |

FOREIGN PATENT DOCUMENTS

| | | |
|---|---|---|
| EP | 2724938 A1 | 4/2014 |
| EP | 2808255 A3 | 1/2018 |
| EP | 3786063 A1 | 3/2021 |
| FR | 894647 A | 12/1944 |
| GB | 1599821 A | 10/1981 |
| JP | 2015519239 A | 7/2015 |
| WO | 2011160111 A1 | 12/2011 |
| WO | 2015014850 A1 | 2/2015 |

OTHER PUBLICATIONS

Search Report for European Application No. 19216179.2 dated Mar. 3, 2021, 2 pages.

* cited by examiner

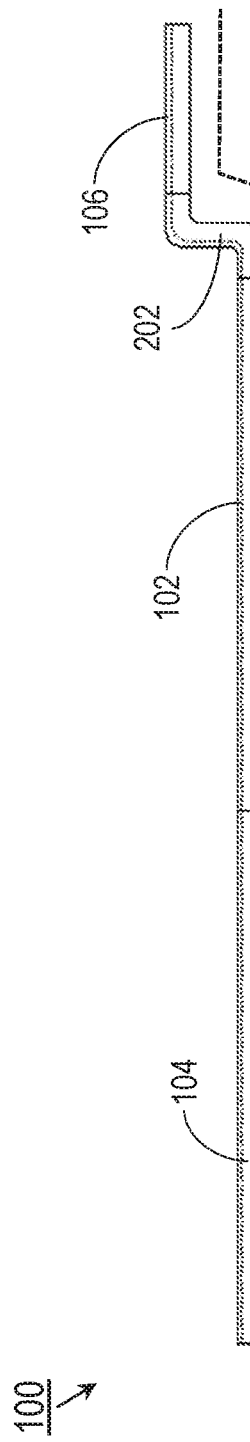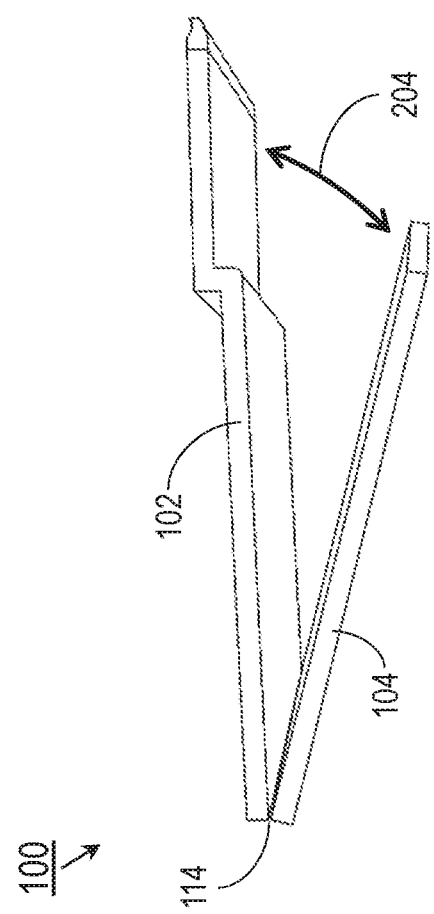

STOWABLE DOOR FOLDING TABLE

BACKGROUND

Within the galley areas of commercial aircraft space is always at a premium, both in terms of floorspace and workspace. Surfaces such as tables, workdecks, etc. may be deployed to temporarily increase the amount of workspace available to cabin crew, e.g., for food service and catering operations once the aircraft has reached a safe cruising altitude. However, the deployment of such temporary surfaces may lead to other challenges for crewmembers. For example, a temporary table may be deployed across a cabin space between a galley structure and another cabin monument, e.g., across the otherwise unused space in front of an exit door. However, the presence of a cabin attendant seat (CAS) on the opposing monument restricts the placement of the temporary table and may require its deployment at a suboptimal height. Furthermore, the temporary table may restrict crew access to water faucets, beverage makers, and other such facilities disposed behind the temporary table. Further, exit doors may incorporate a bustle (e.g., containing an emergency escape slide) projecting into the cabin space, such that any temporary surface extending across the space must account for the bustle, which may preclude the use of linear designs of adequate width.

SUMMARY

A stowable folding table is disclosed. In embodiments, the stowable folding table includes left and right table segments connected by a combination hinge, around which the table segments may be folded parallel to each other for stowage (e.g., in a galley cart bay). The folded table may be unfolded and deployed by attaching both ends (e.g., the left end of the left table segment and the right end of the right table segment) to adjacent galley structures (e.g., on either side of an exit door). When the folding table is deployed across the cabin space between the two galley structures, the left table segment may extend at an angle to the right table segment.

A method for deploying a stowable folding table across a cabin space is also disclosed. In embodiments, the method includes retrieving the folding table from its stowed location within either of two galley structures on either side of the cabin space (e.g., from within a galley cart bay). The method includes unfolding the table along a combination hinge connecting left and right table segments (e.g., such that the unfolded left and right table segments are coplanar). The method includes engaging a first end of a first table segment (e.g., the right end of the right segment, opposite the combination hinge) with an attachment rail in the right-side galley structure. The method includes engaging the other end of the other table segment (e.g., the left end of the left segment) with the opposing galley structure (e.g., the left-side galley structure). The method includes securing the other (e.g., left) table segment to the opposing galley structure by engaging load-bearing pins within the left table segment with corresponding pin receivers set into the opposing (e.g., left-side) galley structure.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A is a lengthwise profile view of the deployable table of FIG. 1;

FIG. 2B is a near profile view of the deployable table of FIG. 1;

DETAILED DESCRIPTION

Figure 1:
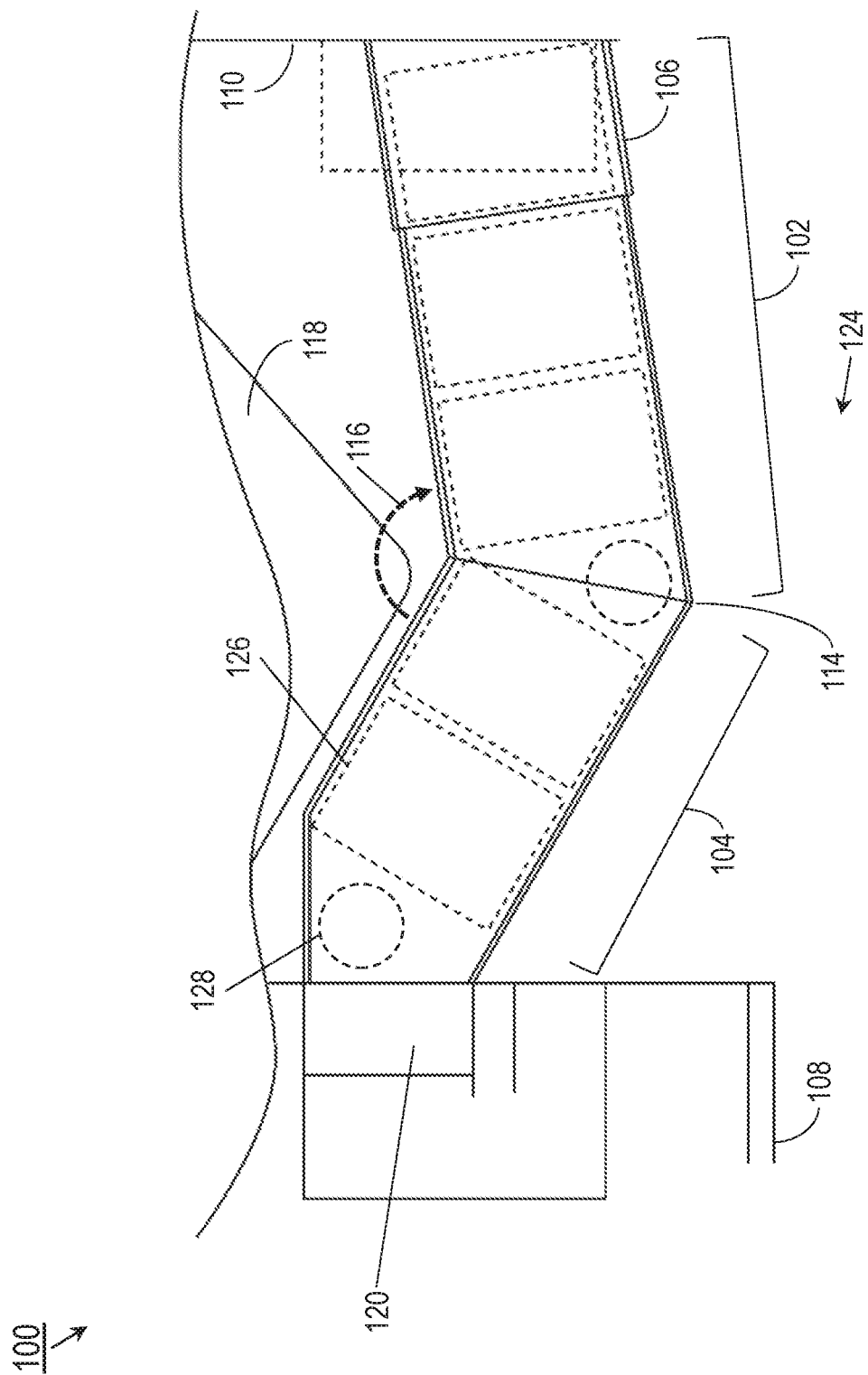
FIG. 1 is an overhead view illustrating a stowable deployable table in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a stowable deployable table 100 is disclosed. In embodiments, the deployable table 100 may include first and second hinged sections 102, 104 and a stepped-up portion 106. For example, the deployable table 100 may be stowed within a galley structure 108 or a cabin monument 110 (e.g., of a commercial aircraft) during taxi, takeoff and landing (TTL) operations and deployed to provide cabin crewmembers with added temporary workspace during in-seat catering and food service operations. The first hinged section 102 and stepped-up portion 106 may attach to the cabin monument 110 above a cabin attendant seat 112 (CAS) mounted to the cabin monument. The first hinged section 102 may be hingedly connected (e.g., via a continuous hinge 114 or piano-type hinge) to the second hinged section 104. The second hinged section 104 may extend from the continuous hinge 114 at an obtuse angle (116) to the first hinged section (e.g., contoured to the exit door bustle 118), maximizing the floorspace available to cabin crew and, e.g., allowing optimal access to a water faucet 120, beverage maker 122, or other galley insert (GAIN) device mounted within the galley structure 108 and accessible from the cabin space 124 between the galley structure and the cabin monument 110 (and adjacent to the exit door). In some embodiments, the top surface of the deployable table 100 may be sufficiently long and wide to simultaneously accommodate multiple service trays (126) and beverage carafes (128) when deployed.

Referring to FIG. 2A, the deployable table 100 is disclosed. In embodiments, the deployable table 100 may include a stepped-up portion 106 connected to the first hinged section 102 by a corner piece 202.

For example, the cabin monument (110, FIG. 1) to which the deployable table 100 is attachable may incorporate a CAS 112 mounted to the monument for the temporary use of flight attendants and cabin crew (e.g., during TTL procedures). The height of the CAS 112 may extend above a height (e.g., above the cabin floor) associated with optimal use of the deployable table 100. Accordingly, the stepped-up portion 106 and corner piece 202 may extend the height of the deployable table 100 proximate to the point where the deployable table attaches to the cabin monument 110, such that the first and second hinged sections 102, 104 may sit at an optimal height while the stepped-up portion 106 accommodates the additional height of the CAS 112.

Referring to FIG. 2B, the deployable table 100 is disclosed. In embodiments, the deployable table 100 may be stowed in a folded configuration and unfolded (204) along the continuous hinge 114. For example, the undersurfaces of the first and second hinged sections 102, 104 may be folded together and unfolded (204) for deployment such that the undersurfaces, as well as the top work surfaces, of both sections are substantially coplanar.

Figure 3:
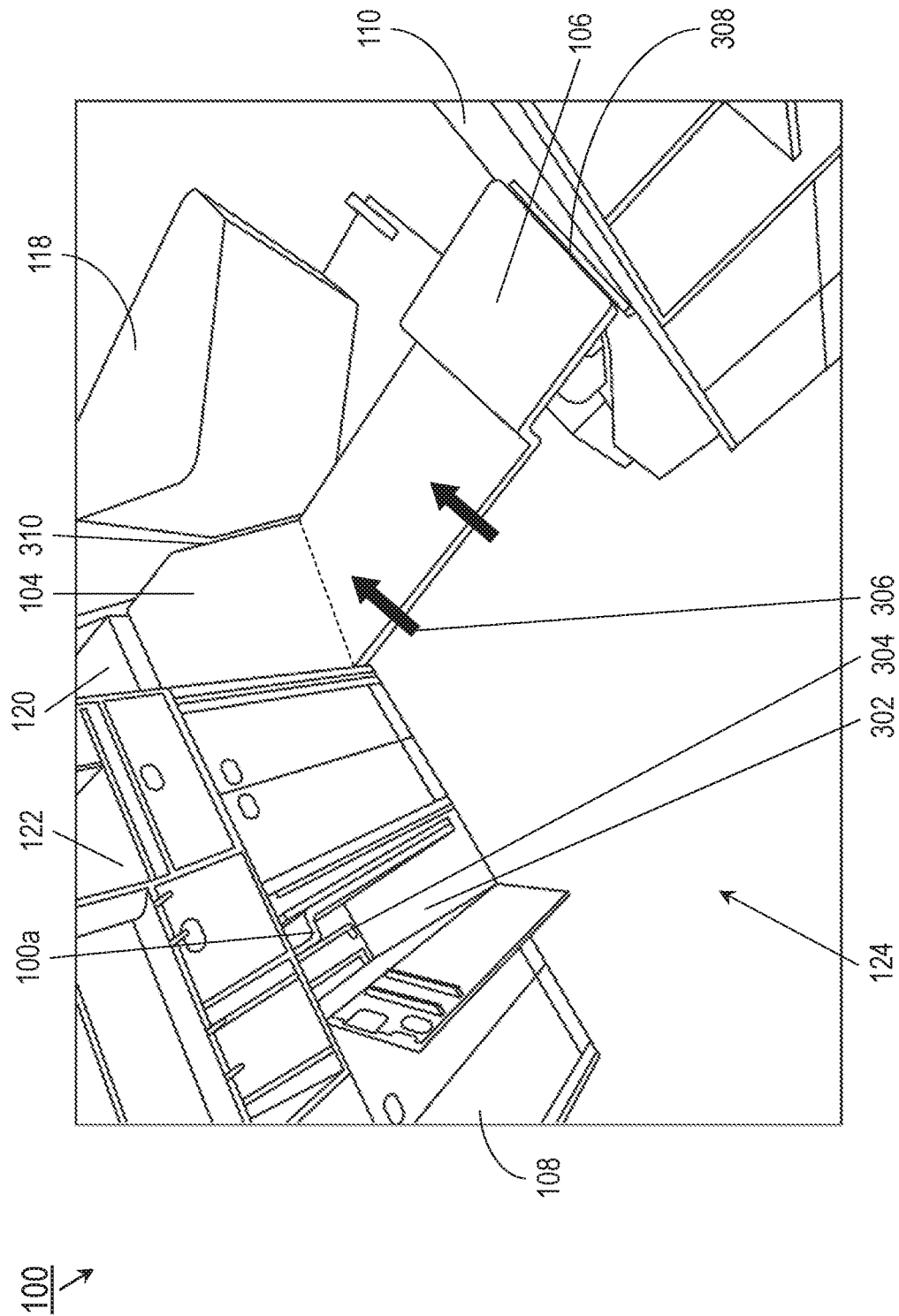
FIG. 3 is an isometric view of the deployable table of FIG. 1 in a deployed and installed state.

Referring to FIG. 3, the deployable table 100 is disclosed. In embodiments, the folded deployable table 100 may be stowed (100a) within a cart bay 302 of the galley structure 108 when not in use. For example, the cart bay 302 may otherwise be sized to accommodate and stow a standard-size galley cart (not shown). The cart bay 302 may be fitted with racking or shelving 304 for stowage of the deployable table 100a while in its folded or stowed state. In some embodiments, the deployable table 100a may be stowed elsewhere either in, or on, one of the two galley structures 108, 110. While in its deployed state, the deployable table 100 may be of sufficient height to accommodate a standard-size galley cart, such that the galley cart may move freely under the deployable table or be temporarily stowed thereunder.

In embodiments, when removed from the cart bay 302 and unfolded, the deployable table 100 may be articulated substantially laterally (306) into a deployed position across the cabin space 124 and between the galley structure 108 and the cabin monument 110. For example, the stepped-up portion 106 may include a terminal end compatible with an attachment rail 308 set into the cabin monument 110, such that the stepped-up portion is guided into position along the attachment rail.

The second hinged portion 104 may contour with the exit door bustle 118 so as to leave a clearance gap 310 between the deployable table and the exit door bustle (e.g., not more than 1 inch (~2.5 cm)). It may be noted that the angle of the second hinged portion 104 provides cabin crewmembers with enhanced access to beverage makers 122 and water faucet/sink facilities (120) within the galley structure 108.

Figure 4:
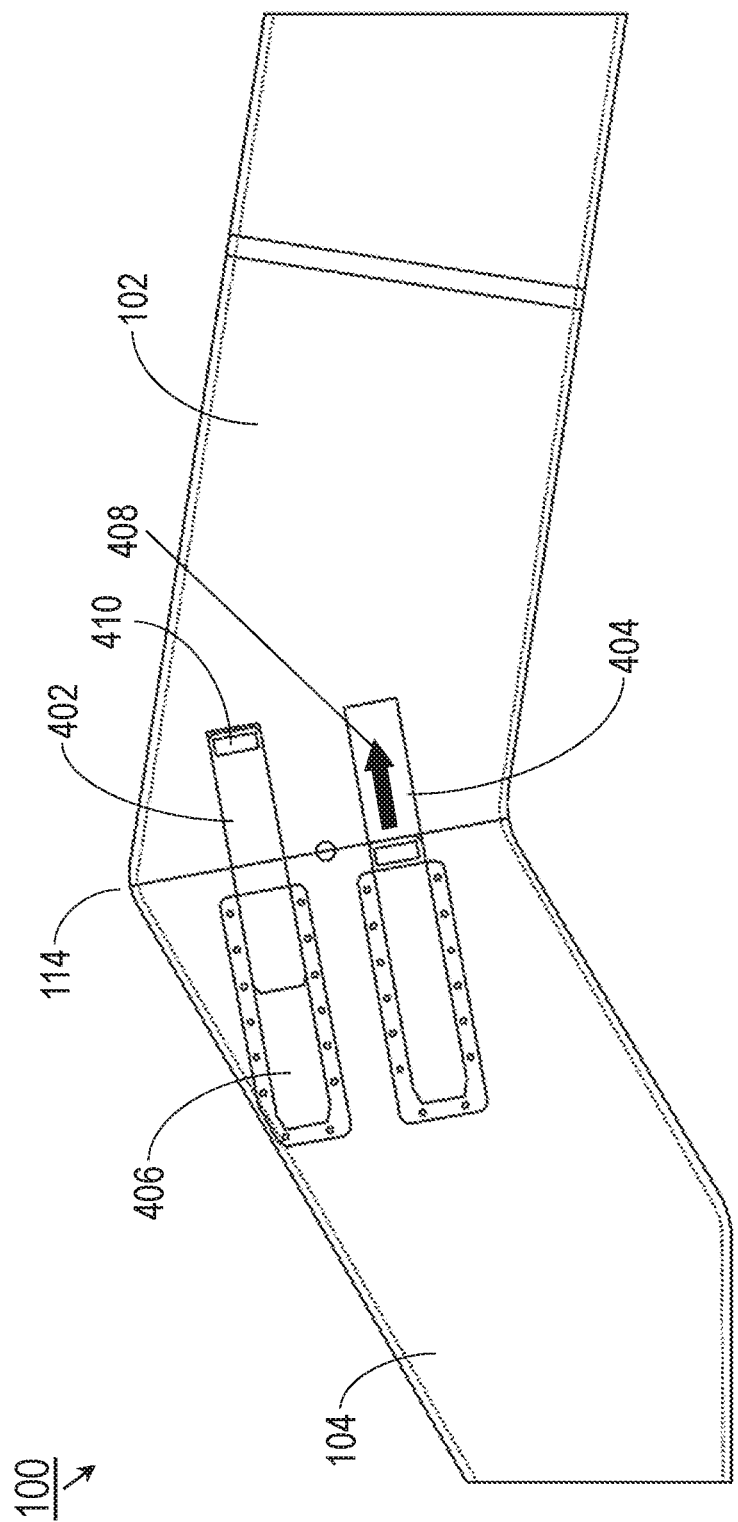
FIG. 4 is an underside view of the deployable table of FIG. 1.

Referring to FIG. 4, the deployable table 100 is disclosed. In embodiments, the deployable table 100 may include composite braces 402 set into recesses 404 on the underside of the first and second hinged sections 102, 104.

For example, the deployable table 100 may be deployed first by unfolding the table along the continuous hinge 114, such that the first and second hinged sections 102, 104 are substantially coplanar. The deployable table 100 may be locked into this unfolded position by deploying the composite braces 402. The composite braces 402 may rest in the underside of the second hinged section 104 under composite cover plates 406 bolted or otherwise fastened to the second hinged section over the recesses 404. When the deployable table 100 is unfolded, the composite braces 402 may be slid into place (408) within the recesses 404 (e.g., using the finger recesses 410 set into the composite braces 402), bracing the deployable table in the unfolded position for deployment (304, FIG. 3).

Referring to FIGS. 5A through 5D, the deployable table 100 is shown. In embodiments, referring in particular to FIGS. 5A and 5B, the stepped-up section 106 of the deployable table 100 may include a terminal end 502 capable of engaging with the attachment rail 308 set into the cabin monument 110. For example, the terminal end 502 may engage with the attachment rail 308 in a "hooked" fashion; as the deployable table 100 is inserted into the attachment rail (504) and rotated downward (504a) into the deployed position, the terminal end 502 is secured in a corresponding indentation (506) set into the attachment rail, securing the deployable table horizontally.

Figure 5A:
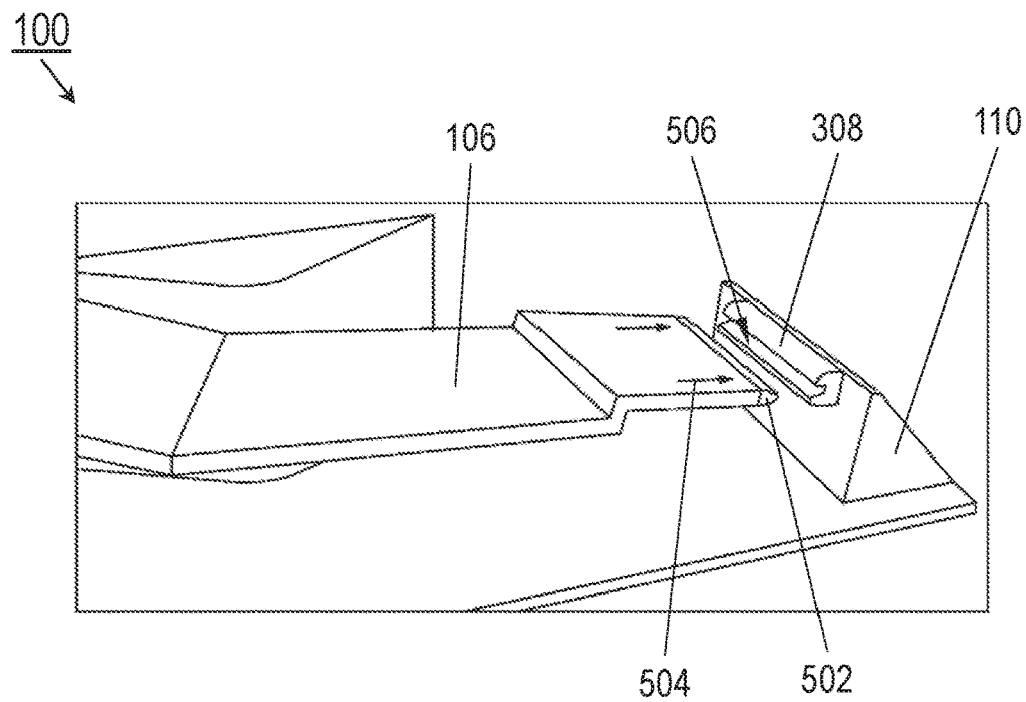
FIGS. 5A and 5B are isometric views of an attachment rail compatible with the deployable table of FIG. 1.
Figure 5B:
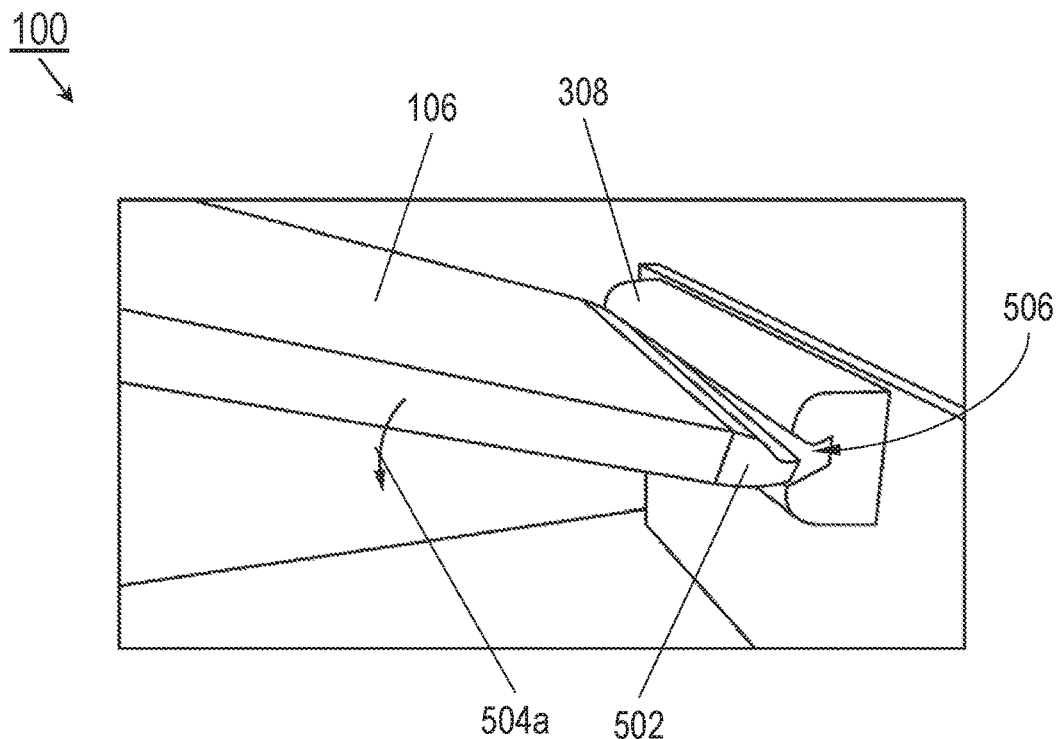
Figure 5C:
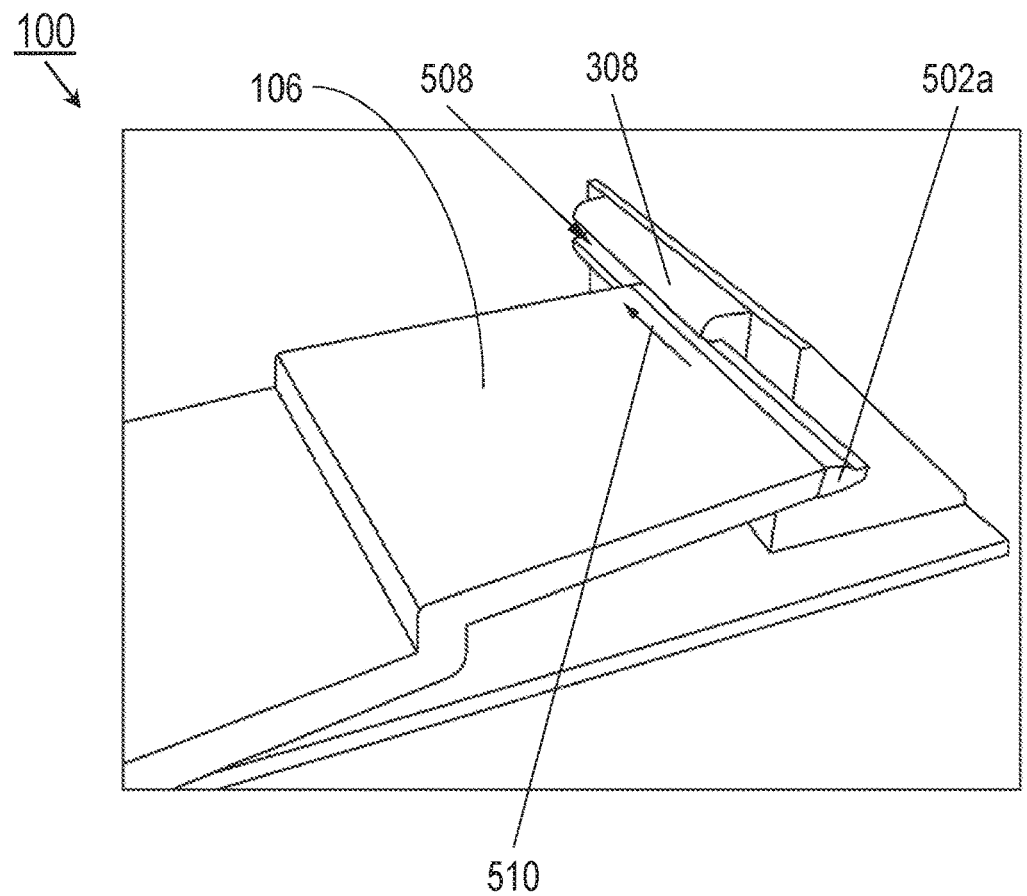
FIGS. 5C and 5D are isometric views of an attachment rail compatible with the deployable table of FIG. 1.
Figure 5D:
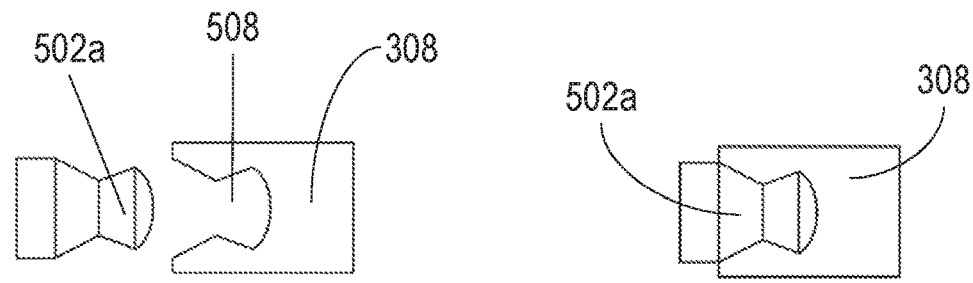

Referring in particular to FIGS. 5C and 5D, the terminal end 502a may be implemented and may function similarly to the terminal end 502 of FIG. 5A, except that the terminal end 502a may engage laterally and slidably engage with a corresponding indentation (508) in the attachment rail 308. For example, one end of the deployable table 100 may be inserted laterally (510) into the indentation 508 via the terminal end 502 and slid laterally along the attachment rail 308 until the sides of the terminal end and the attachment rail are flush on either end, securing the deployable table into its deployed position between the galley structure and the cabin monument.

Figure 6A:
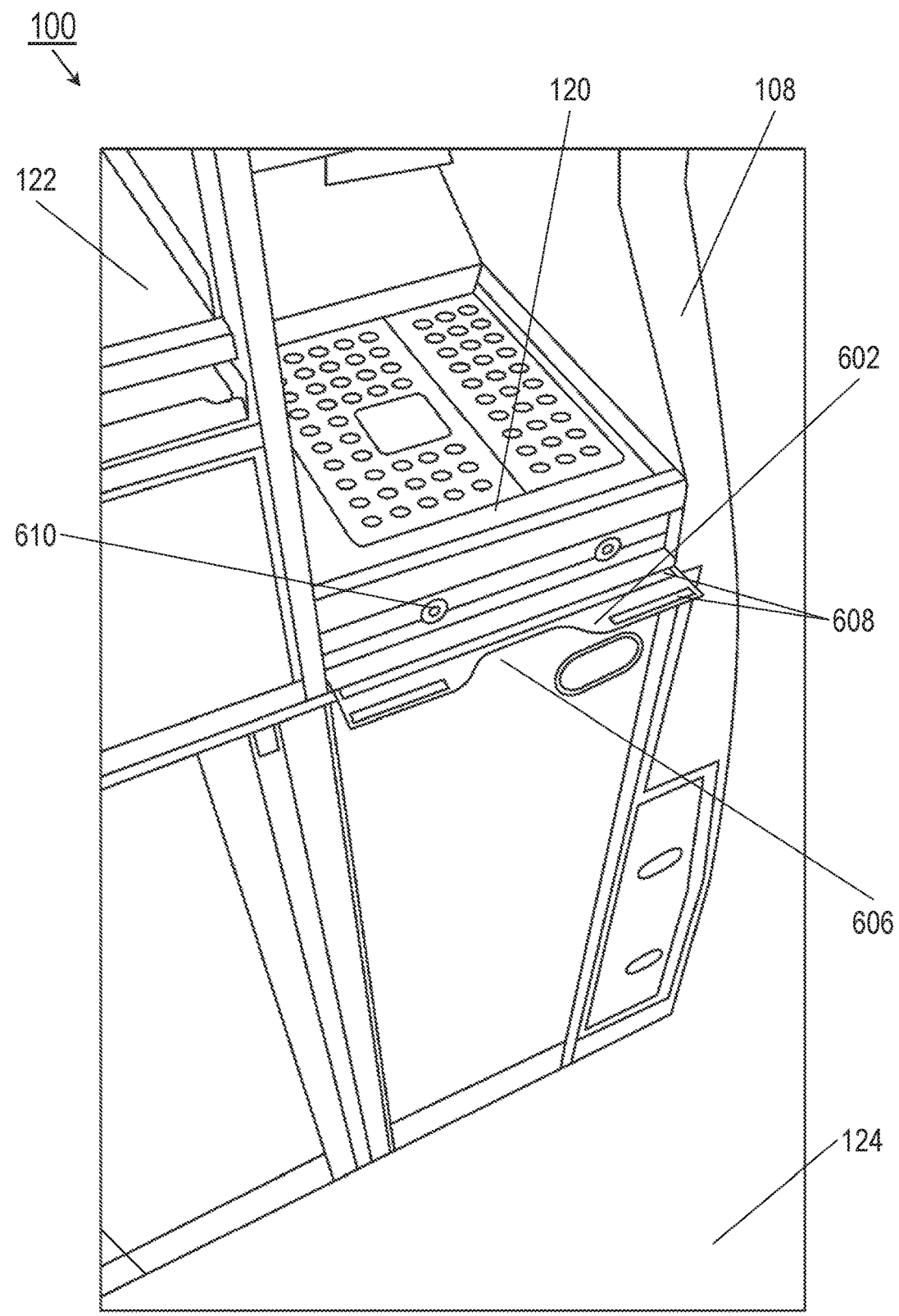
FIG. 6A is an isometric view.
Figure 6B:
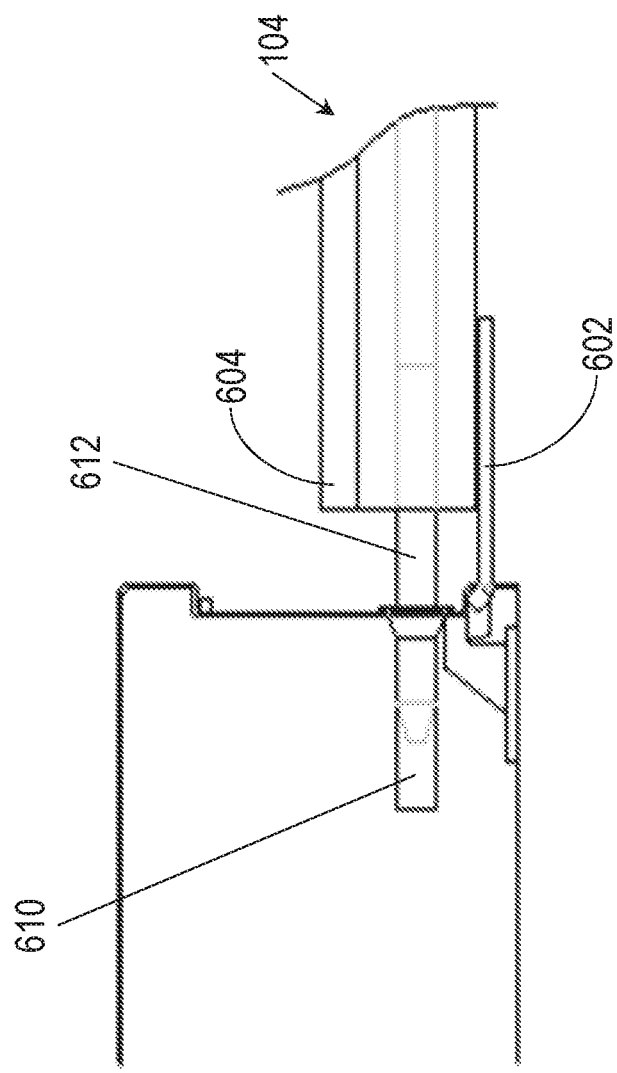
FIG. 6B is a diagrammatic partial cross section, illustrating a galley structure compatible with the deployable table of FIG. 1.

Referring to FIGS. 6A and 6B, the deployable table 100 and galley structure 108 are disclosed. In embodiments, the galley structure 108 may include a fold-down shelf 602 capable of engaging with the terminal end 604 of the second hinged section 104 of the deployable table 100. In some embodiments, the fold-down shelf 602 may be incorporated into a sliding table (not shown) capable of extending from the galley structure 108 into the cabin space 124.

For example, when the deployable table 100 is substantially laterally deployed (306, FIG. 3) into position between the galley structure 108 and the cabin monument (110, FIG. 3), the fold-down shelf 602 may be deployed (e.g., via a finger grip slot 606) from the galley structure opposite the attachment rail (308, FIG. 3) set into the cabin monument 110. The fold-down shelf 602 may deploy from beneath a sink/faucet installation 120 (or, e.g., a beverage maker or similarly sized galley insert (GAIN) device) within the galley structure 108, opening into the cabin space 124.

In embodiments, the fold-down shelf 602 may incorporate bump strips 608 capable of facilitating the deployment of the deployable table 100. For example, the terminal end 604 of the second hinged section 104 may slide along the bump strips 608 into its deployed position (e.g., as shown by FIG. 3). The fold-down shelf 602 may also reveal, in its folded-down position, pin receivers 610 set into the galley structure 108. For example, referring in particular to FIG. 6B, load bearing pins 612 may be set into the terminal end 604 of the second hinged section 104. The deployable table 100 may be secured in its deployed position by sliding or latching the load-bearing pins 612 into their corresponding pin receivers 610.

Figure 7:
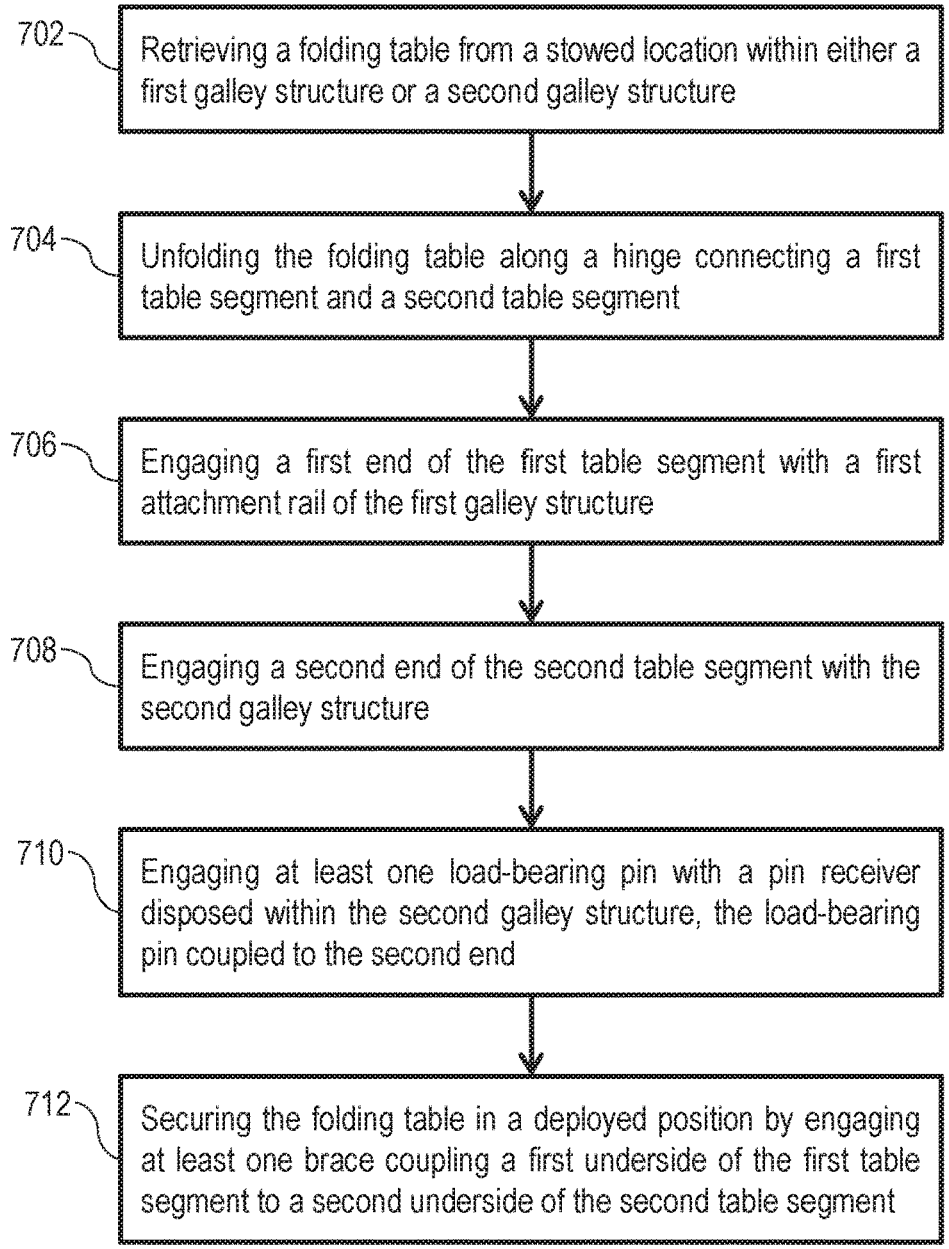
FIG. 7 is a process flow diagram illustrating a method for deployment of a temporary table in accordance with embodiments of the inventive concepts disclosed herein.

Referring to FIG. 7, an exemplary embodiment of a method 700 for deploying a stowable folding table may be implemented via the deployable table 100 of FIGS. 1 through 6B and may include the following steps.

At a step 702, a stowable deployable table may be retrieved from a stowage location within a galley structure or cabin monument.

At a step 704, the deployable table may be unfolded along a hinge connecting its first and second hinged sections.

At a step 706, a first terminal end of the deployable table (e.g., one of the hinged sections) may engage with an attachment rail set into the corresponding galley structure or cabin monument.

At a step 708, the opposing terminal end of the deployable table may engage with the opposing galley structure or cabin monument. For example, the terminal end may engage with one or more bump strips accessed by deploying a fold-down shelf from the opposing galley structure.

At a step 710, the terminal end may be secured to the galley structure by engaging (e.g., latching, extending) one or more load-bearing pins (attached to, or incorporated into, the second end) with pin receivers revealed by the deployment of the fold-down shelf.

The method 700 may include an additional step 712; at the step 712 the folding table may be secured in its deployed position by engaging one or more braces connecting the undersurfaces of the respective hinged sections.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A stowable folding table, comprising:
   a first table segment hingedly attached to a second table segment, the first table segment terminating in a first end and the second table segment terminating in a second end;
   the folding table having at least a deployed state and a folded state, the deployed state associated with attaching the first end to a first galley structure of an aircraft and the second end to a second galley structure of the aircraft, the first table segment extending at an angle to the second table segment when in the deployed state;
   the second end including a stepped-up portion having a greater height than the first table segment and the second table segment, the stepped-up portion capable of accommodating thereunder a cabin attendant seat mounted to the second galley structure when the folding table is in the deployed state; and
   the folding table stowable within either the first galley structure or the second galley structure, the first table segment parallel to the second table segment, when in the folded state.

2. The stowable folding table of claim 1, wherein the first table segment extends at an obtuse angle to the second table segment when in the deployed state.

3. The stowable folding table of claim 1, wherein:
   the folding table extends across a cabin space between the first galley structure and the second galley structure when in the deployed state, the cabin space adjacent to an exit door of the aircraft; and
   at least one of the first table segment and the second table segment is contoured to a bustle of the exit door when the folding table is in the deployed state.

4. The stowable folding table of claim 1, wherein:
   the folding table is capable of accommodating at least one galley cart between the folding table and a floor of the aircraft when in the deployed state.

5. The stowable folding table of claim 1, wherein:
the second end is configured to engage with an attachment rail of the second galley structure, the attachment rail capable of securing the folding table in the deployed state.

6. The stowable folding table of claim 5, wherein the second end is configured to engage by hooking into the attachment rail.

7. The stowable folding table of claim 5, wherein the second end is configured to laterally and slidably engage with the attachment rail.

8. The stowable folding table of claim 1, wherein:
the first table segment has a first underside and the second table segment has a second underside, the first underside and the second underside sharing at least one recess; and
either the first underside or the second underside further comprises at least one brace disposed within the at least one recess, the brace capable of slidably extending into the opposing underside to secure the folding table in the deployed state.

9. The stowable folding table of claim 8, wherein:
the first underside and the second underside are connected by a continuous hinge.

10. The stowable folding table of claim 1, further comprising:
at least one load bearing pin set into the first end, each load bearing pin configured to slidably engage with a pin receiver of the first galley structure to secure the folding table in the deployed state.

11. The stowable folding table of claim 10, wherein:
the first end is configured to engage with a deployable shelf of the first galley structure, the pin receivers disposed behind the deployable shelf.

12. The stowable folding table of claim 1, wherein:
at least one of the first galley structure and the second galley structure includes one or more cart bays, each cart bay capable of stowing a galley cart therewithin; and
the folding table is stowable within a first cart bay of the one or more cart bays when in the folded state.

13. A stowable folding table, comprising:
a first table segment hingedly attached to a second table segment, the first table segment terminating in a first end and the second table segment terminating in a second end;
the folding table having at least a deployed state and a folded state, the deployed state associated with attaching the first end to a first galley structure of an aircraft and the second end to a second galley structure of the aircraft, the first table segment extending at an angle to the second table segment when in the deployed state;
the second end configured to engage with an attachment rail of the second galley structure, the attachment rail capable of securing the folding table in the deployed state; and
the folding table stowable within either the first galley structure or the second galley structure, the first table segment parallel to the second table segment, when in the folded state.

14. A stowable folding table, comprising:
a first table segment hingedly attached to a second table segment, the first table segment terminating in a first end and having a first underside, the second table segment terminating in a second end and having a second underside, the first underside and the second underside sharing at least one recess;
the folding table having at least a deployed state and a folded state, the deployed state associated with attaching the first end to a first galley structure of an aircraft and the second end to a second galley structure of the aircraft, the first table segment extending at an angle to the second table segment when in the deployed state;
either the first underside or the second underside including at least one brace disposed within the at least one recess, the at least one brace capable of slidably extending into the opposing underside to secure the folding table in the deployed state; and
the folding table stowable within either the first galley structure or the second galley structure, the first table segment parallel to the second table segment, when in the folded state.

* * * * *